(12) United States Patent
Klein et al.

(10) Patent No.: US 11,137,874 B2
(45) Date of Patent: Oct. 5, 2021

(54) ERGONOMIC MIXED REALITY INFORMATION DELIVERY SYSTEM FOR DYNAMIC WORKFLOWS

(71) Applicant: Microsoft Technology Licensing, LLC, Redmond, WA (US)

(72) Inventors: Andrew Jackson Klein, Vancouver (CA); Ethan Harris Arnowitz, Vancouver (CA); Kevin Thomas Mather, Vancouver (CA); Kyle Mouritsen, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/423,374

(22) Filed: May 28, 2019

(65) Prior Publication Data

US 2020/0273252 A1 Aug. 27, 2020

Related U.S. Application Data

(60) Provisional application No. 62/808,848, filed on Feb. 22, 2019.

(51) Int. Cl.
*G06F 3/01* (2006.01)
*G06T 19/00* (2011.01)
(Continued)

(52) U.S. Cl.
CPC ....... *G06F 3/04815* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 9,235,051 B2   1/2016  Salter et al.
9,754,420 B2   9/2017  Scavezze et al.
(Continued)

FOREIGN PATENT DOCUMENTS

EP    2778842 A1    9/2014
WO   2018118661 A1  6/2018
WO   2018156809 A1  8/2018

OTHER PUBLICATIONS

Bray, et al., "What is mixed reality?", Retrieved From: https://docs.microsoft.com/en-us/windows/mixed-reality/mixed-reality, Mar. 21, 2018, 5 Pages.
(Continued)

*Primary Examiner* — Yanna Wu
(74) *Attorney, Agent, or Firm* — Davin Chin; Chin IP, PLLC

(57) ABSTRACT

The disclosed technology is generally directed to mixed reality devices. In one example of the technology, a mixed-reality view is caused to be provided to an operator. The mixed-reality view includes both a real-world environment of the operator and holographic aspects. While the operator is navigated to a step of the task, the mixed-reality view is caused to include a step card, such that the step card includes at least one instruction associated with the step. The operator is enabled to adjust a state associated with the step card. While the state associated with the step card is a first state: a gaze determination associated with a gaze of the operator is made; and responsive to a positive gaze determination, the step card is caused to move to a location that is associated with a real-world location of the gaze of the operator.

20 Claims, 7 Drawing Sheets

(51) Int. Cl.

| | |
|---|---|
| *G06F 3/0481* | (2013.01) |
| *G06F 3/0482* | (2013.01) |
| *G06F 3/0484* | (2013.01) |
| *G06T 19/20* | (2011.01) |
| *H04L 29/06* | (2006.01) |
| *G02B 27/01* | (2006.01) |
| *G09G 5/37* | (2006.01) |
| *G09B 5/02* | (2006.01) |
| *G09B 19/00* | (2006.01) |
| *G06F 3/16* | (2006.01) |

(52) U.S. Cl.
CPC ............. *G06F 3/011* (2013.01); *G06F 3/012* (2013.01); *G06F 3/0482* (2013.01); *G06F 3/04845* (2013.01); *G06T 19/006* (2013.01); *G06T 19/20* (2013.01); *G09B 5/02* (2013.01); *G09B 19/003* (2013.01); *G09G 5/37* (2013.01); *H04L 67/38* (2013.01); *G02B 2027/0141* (2013.01); *G02B 2027/0174* (2013.01); *G06F 3/013* (2013.01); *G06F 3/017* (2013.01); *G06F 3/167* (2013.01); *G06T 2200/04* (2013.01); *G09G 2354/00* (2013.01)

(56) References Cited

U.S. PATENT DOCUMENTS

| | | | |
|---|---|---|---|
| 9,984,506 | B2 | 5/2018 | Miller |
| 10,002,337 | B2 | 6/2018 | Siddique et al. |
| 10,203,762 | B2 | 2/2019 | Bradski et al. |
| 10,516,869 | B2 | 12/2019 | Kim |
| 10,652,250 | B2 | 5/2020 | Thomas |
| 2006/0241792 | A1 | 10/2006 | Pretlove et al. |
| 2014/0152558 | A1 | 6/2014 | Salter et al. |
| 2014/0333666 | A1* | 11/2014 | Poulos .................. G06F 3/147 345/633 |
| 2014/0368533 | A1* | 12/2014 | Salter .................. G06F 3/04815 345/619 |
| 2016/0210784 | A1 | 7/2016 | Ramsby et al. |
| 2016/0350595 | A1 | 12/2016 | Solomin et al. |
| 2016/0379415 | A1 | 12/2016 | Espeset et al. |
| 2017/0004655 | A1 | 1/2017 | Scavezze et al. |
| 2017/0092002 | A1 | 3/2017 | Mullins et al. |
| 2017/0220134 | A1 | 8/2017 | Burns |
| 2018/0365898 | A1 | 12/2018 | Costa |
| 2019/0060708 | A1 | 2/2019 | Fung |
| 2019/0147272 | A1 | 5/2019 | Yokota et al. |
| 2019/0250408 | A1* | 8/2019 | Lafon .................. B64D 43/00 |
| 2019/0262537 | A1 | 8/2019 | O'connell et al. |
| 2019/0304188 | A1* | 10/2019 | Bridgeman .............. G09B 5/02 |
| 2019/0308109 | A1 | 10/2019 | Sullivan |
| 2019/0349380 | A1 | 11/2019 | Thomas |
| 2020/0082631 | A1 | 3/2020 | Yoon et al. |
| 2020/0272227 | A1 | 8/2020 | Mather et al. |
| 2020/0273254 | A1 | 8/2020 | Bennett et al. |

OTHER PUBLICATIONS

Bryceho, "Operator's manual for Dynamics 365 Guides in preview", Retrieved From: https://docs.microsoft.com/en-us/dynamics365/mixed-reality/guides/operator-guide, Feb. 24, 2019, 17 Pages.
Bryceho, "Test your guide and place holograms using HoloLens Author mode", Retrieved From: https://docs.microsoft.com/en-us/dynamics365/mixed-reality/guides/hololens-authoring, Mar. 26, 2019, 29 Pages.
Milgram, et al., "A Taxonomy of Real and Virtual World Display Integration", Published in Journal of Mixed reality: Merging real and virtual worlds, vol. 1, Mar. 1999, 26 Pages.
Porter, et al., "Why Every Organization Needs an Augmented Reality Strategy", Retrieved From: https://hbr.org/2017/11/a-managers-guide-to-augmented-reality, Nov. 2017, 25 Pages.
Williamson, et al., "Social Gravity: A Virtual Elastic Tether for Casual, Privacy-Preserving Pedestrian Rendezvous", In Proceedings of the SIGCHI Conference on Human Factors in Computing Systems, Apr. 10, 2010, pp. 1485-1494.
Zeller, et al., "Spatial mapping", Retrieved From: https://docs.microsoft.com/en-us/windows/mixed-reality/spatial-mapping, Mar. 21, 2018, 15 Pages.
Bennett, et al., "Ergonomic Mixed Reality Step-By-Step Instructions Tethered To 3d Holograms In Real-World Locations", Application As Filed in U.S. Appl. No. 16/427,149, filed May 30, 2019, 44 Pages.
Mather, et al., "Mixed Reality Intelligent Tether For Dynamic Attention Direction", Application As Filed in U.S. Appl. No. 16/423,881, filed May 28, 2019, 41 Pages.
Schart, Dirk, "Augmented Reality für die digitate Zukunft der Industrie", Published in VDI Wissensforum, Retrieved From: https://www.vdi-wissensforum.de/news/augmented-reality-fuer-die-digitale-zukunft-der-industrie/, Apr. 8, 2017, 6 Pages.
"Non-Final Office Action Issued in U.S. Appl. No. 16/427,149", dated Jul. 2, 2020, 9 Pages.
Electric, Schneider, "Hololens Application on Premset", Retrieved From: https://www.youtube.com/watch?v=RpXyagutoZg, Feb. 22, 2017, 1 Page.
He et al., "Progress in Virtual Reality and Augmented Reality Based on Holographic Display", In Journal of Applied Optics, vol. 58, Issue 5, Feb. 10, 2019, pp. A74-A81.
Reuter, Rick, "Wearable Technology in the Lean Enterprise", Retrieved From: https://www.youtube.com/watch?v=WqKfdTm3LG8, Nov. 6, 2017, 1 Page.
"Non Final Office Action Issued in U.S. Appl. No. 16/423,881", dated Apr. 23, 2020, 27 Pages.
"International Search Report and Written Opinion Issued in PCT Application No. PCT/US2020/014689", dated May 13, 2020, 12 Pages.
"International Search Report and Written Opinion Issued in PCT Application No. PCT/US20/014679", dated May 13, 2020, 12 Pages.
"Final Office Action Issued in U.S. Appl. No. 16/423,881", dated Aug. 10, 2020, 27 Pages.
"International Search Report and Written Opinion Issued in PCT Application No. PCT/US20/015761", dated Jul. 14, 2020, 12 Pages.
"Non Final Office Action Issued in U.S. Appl. No. 16/423,881", dated Oct. 28, 2020, 26 Pages.
"Final Office Action Issued in U.S. Appl. No. 16/423,881", dated Feb. 24, 2021, 26 Pages.

\* cited by examiner

ERGONOMIC MIXED REALITY INFORMATION DELIVERY SYSTEM FOR DYNAMIC WORKFLOWS

CROSS-REFERENCE TO RELATED APPLICATION(S)

This application claims priority to U.S. Provisional Pat. App. No. 62/808,848, filed Feb. 22, 2019, entitled "MIXED REALITY USER INTERFACE". The entirety of this aforementioned application is incorporated herein by reference.

BACKGROUND

Typically, mixed reality (MR) refers to a combination of virtual and real environments to produce new environments and visualizations where physical and digital objects co-exist and can be interacted with in real time. Typically, mixed reality takes place not only in the physical world or the virtual world, but includes a mix of elements from reality and virtual reality, encompassing both augmented reality and augmented virtuality via immersive technology.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to mixed reality devices. In one example of the technology, a mixed-reality view is caused to be provided to an operator. In some examples, the mixed-reality view includes both a real-world environment of the operator and holographic aspects. In some examples, the operator is enabled to navigate among a plurality of steps of a task, such that for at least one step of the plurality of steps of the task, while the operator is navigated to the step of the task, the mixed-reality view is caused to include a step card, such that the step card includes at least one instruction associated with the step. In some examples, the operator is enabled to adjust a state associated with the step card. In some examples, while the state associated with the step card is a first state: a gaze determination associated with a gaze of the operator is made; and responsive to a positive gaze determination, the step card is caused to move to a location that is associated with a real-world location of the gaze of the operator.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
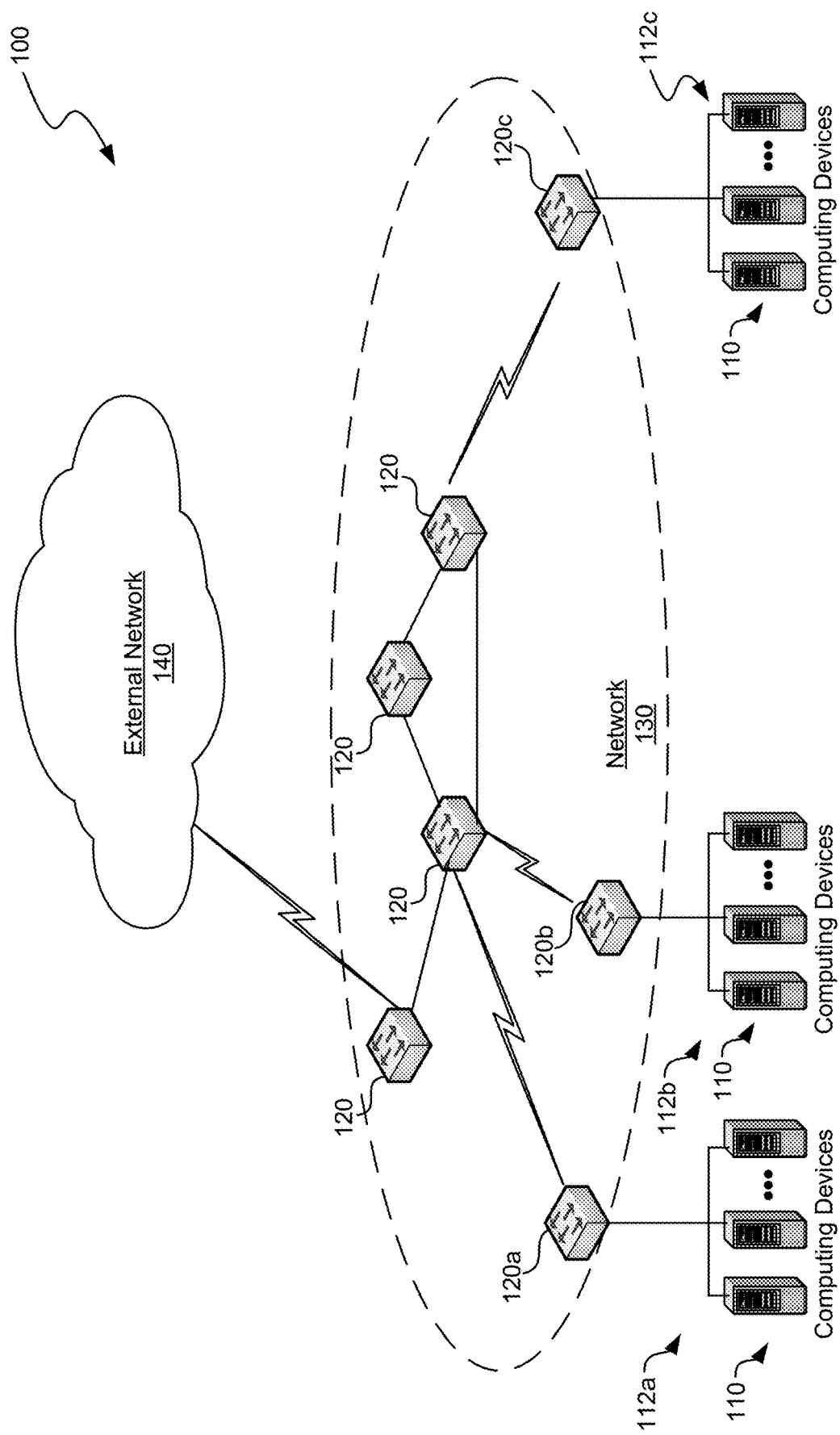
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to mixed reality devices. In one example of the technology, a mixed-reality view is caused to be provided to an operator. In some examples, the mixed-reality view includes both a real-world environment of the operator and holographic aspects. In some examples, the operator is enabled to navigate among a plurality of steps of a task, such that for at least one step of the plurality of steps of the task, while the operator is navigated to the step of the task, the mixed-reality view is caused to include a step card, such that the step card includes at least one instruction associated with the step. In some examples, the operator is enabled to adjust a state associated with the step card. In some examples, while the state associated with the step card is a first state: a gaze determination associated with a gaze of the operator is made; and responsive to a positive gaze determination, the step card is caused to move to a location that is associated with a real-world location of the gaze of the operator.

An operator may wear a wearable mixed-reality device, such as a head-mounted display mixed-reality device, that provides the operator with a mixed-reality view. The mixed-reality device may provide a mixed-reality view that includes one or more instructions for each step of a task to be completed. For each step of the task, a step card may be provided in the mixed-reality view that indicates one or more instructions for the current step of the task. In some examples, the mixed-reality view may also include: a three-dimensional hologram that is associated with the current step of the task, and a holographic visual tether that connects the step card to the three-dimensional hologram that is associated with the current step.

The operator may operate with the step card pinned, with the operator having the option to pin the step card to a particular real-world location unless a subsequent command causes the step card to move from that location, or the operator may operate with the step card unpinned. In some examples, if the step card is unpinned, the step card may follow the operator to an extent.

For instance, in some examples, the step card remains in a fixed location and only follows the operator's gaze when the operator indicates significant intention to move to a new area. In some examples, there is a safe zone around the card, which may, in some examples, be a pie shape or cone shape at a particular angle. In some examples, if the operator's gaze crosses the threshold of the pie shape, a timer is started, such as a two-second timer. In some examples, if the operator's gaze remains outside of the pie shape for the duration of the timer, then the Step card moves to the new location of the operator's gaze.

The gaze determination is not necessarily limited to the angle of the operator's gaze, but may also be based on other aspects of the operator's gaze and/or the operator's head movements. For example, the gaze determination is not necessarily limited to the spot at which the operator is gazing, but also to where the user's head is relative to the spot at which the operator is gazing. For example, if the operator's gaze moves to a lower position, the tag-along behavior of the card may vary depending on whether the user's head remained in the same position with the user looking downward at the lower spot, or whether instead the operator squatted down, keeping his gaze at the same angle but looking at a lower spot due to the operator's head being at a lower position.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-412c. In the illustrated example, each of host sets 112a-412c is operatively coupled to a corresponding network node 120a-420c, respectively, which are commonly referred to as "top-of-rack" or "TOR" network nodes. TOR network nodes 120a-420c can then be operatively coupled to additional network nodes 120 to form a computer network in a hierarchical, flat, mesh, or other suitable types of topology that allows communications between computing devices 110 and external network 140. In other examples, multiple host sets 112a-412c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Although FIG. 1 shows an example of a device in a network environment, not all examples of the disclosure are network devices. That is, some examples of the disclosure are capable of operating as connected devices that communicate with one or more networks, and some example of the disclosure are not capable of connecting to a network.

Illustrative Computing Device

Figure 2:
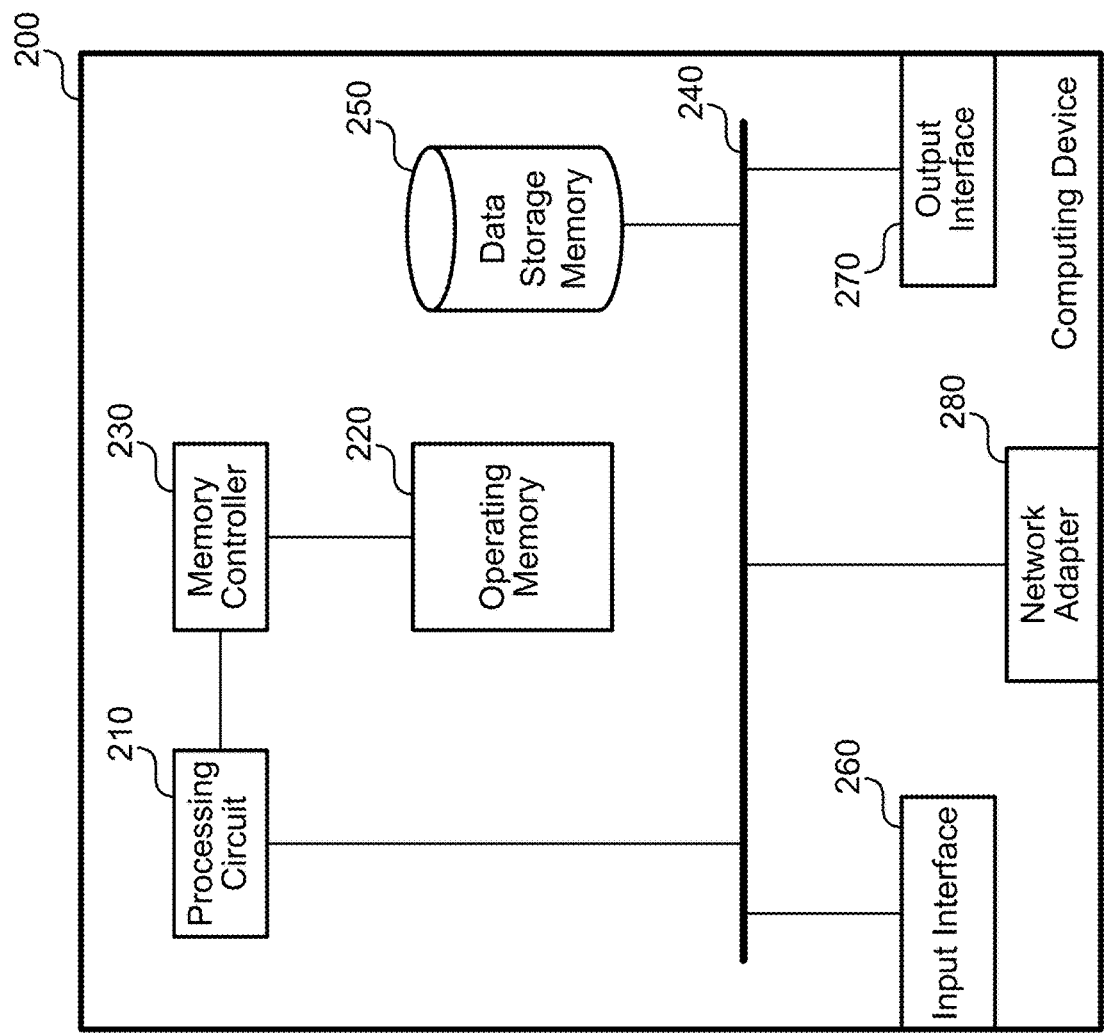
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-6, as discussed in greater detail below. As illustrated in FIG. 2, computing device 200 includes processing circuit 210, operating memory 220, memory controller 230, data storage memory 250, input interface 26o, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate ($DDR_4$) memory, 3rd generation double data rate ($DDR_3$) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media" (whether in the plural or singular form), throughout the specification and the claims, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I$_2$C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
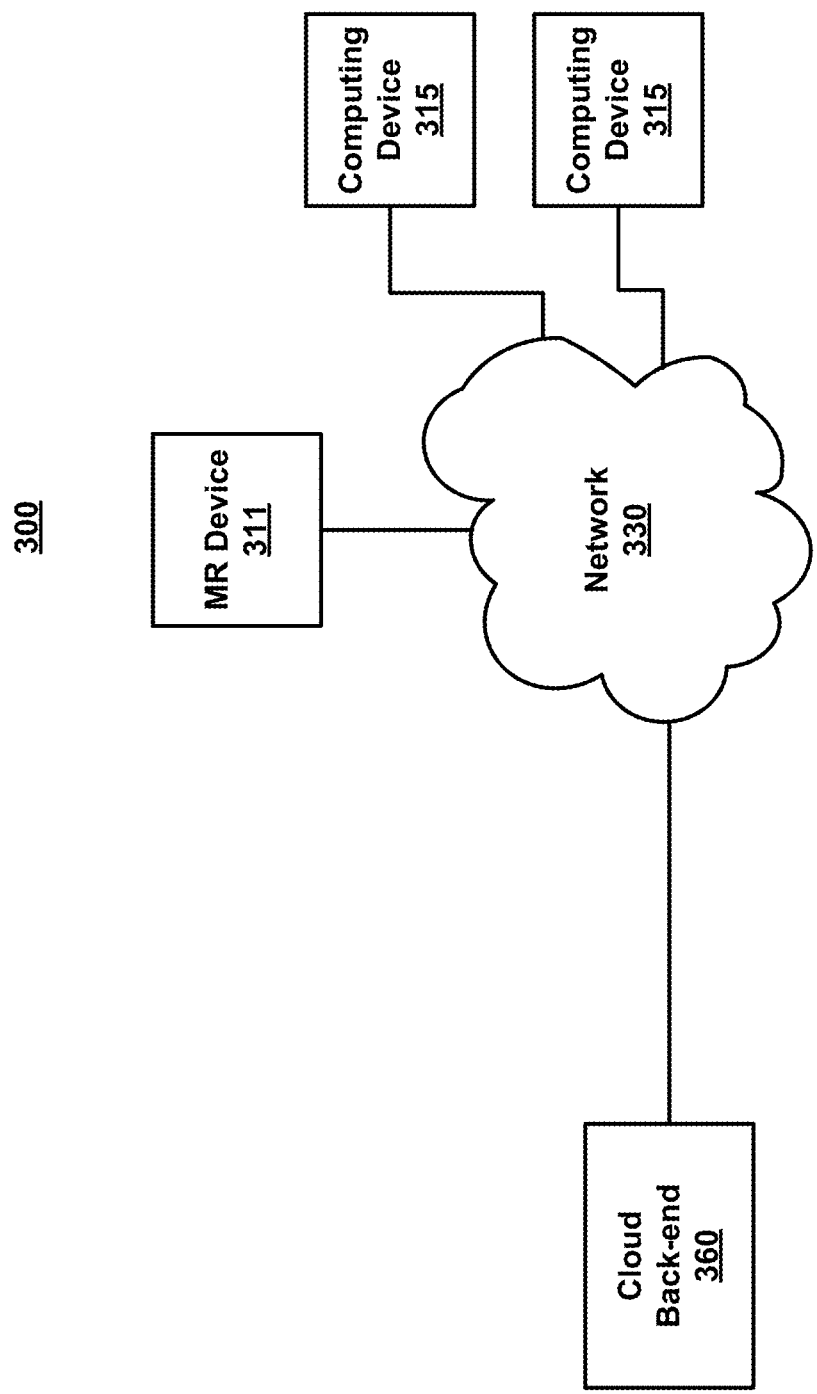
FIG. 3 is a block diagram illustrating an example of a system.

FIG. 3 is a block diagram illustrating an example of a system (300). System 300 may include network 330, as well MR device 311, computing devices 315, and cloud back-end 360, which may each connect to network 330.

MR device 311 and computing devices 315 may each include an example of computing device 200 of FIG. 2. Although two computing devices 315 are illustrated in FIG. 3, in various examples, there may be one computing device 315, three or more computing devices 315, and/or the like. Application back-end 360 refers to a device, or multiple devices such as a distributed system, that may assist in providing functionality to MR device 311 and/or computing device 315 via communication over network 330. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some devices may be connected to a user device via a different network in network 330 than other devices. In essence, network 330 includes any communication technology by which information may travel between MR device 311, computing devices 315, and cloud back-end 360. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Each computing device 315 may perform various functions in conjunction with MR device 311, and each computing device 315 may be capable of communicating over network 330 with MR device 311 and cloud back-end 360. As discussed in greater detail below, one of the computing devices 315 may be used to assist in the creation of guides for MR device 311, and/or the like.

MR device 311 may include any suitable MR device such as a wearable mixed-reality device. Some examples of MR device 311 may be a head-mounted display unit connected to an adjustable inner headband. Some examples of MR device 311 may include a self-contained holographic computer that enables a user to engage with digital content and interact with holograms while simultaneously viewing the real world. Some examples of MR device 311 may include cameras, processors, lenses, 3D audio speakers, a battery, and various specialized components such as multiple sensors, advanced optics, and a custom holographic processing unit. Some examples of MR device 311 may include physical buttons on the side which may be pressed to actuate various functions.

Some examples of MR device 311 may communicate with cloud back-end 360 to provide certain functions associated with MR device 311. Other examples of MR device 311 provide full functionality within MR device 311 without requiring communication with cloud back-end 360, and cloud back-end 360 is not included in system 300 in some examples. In some examples, MR device 311 is network-connected, and in other examples, MR device 311 is not network-connected.

MR device 311 may allow a user to simultaneously view the real world and virtual objects. The user may also be able to manipulate the virtual objects in various ways. The user may also be able to view applications in the mixed-reality view provided by MR device 311.

System 300 may include more or less devices than illustrated in FIG. 3, which is shown by way of example only.

Figure 4:
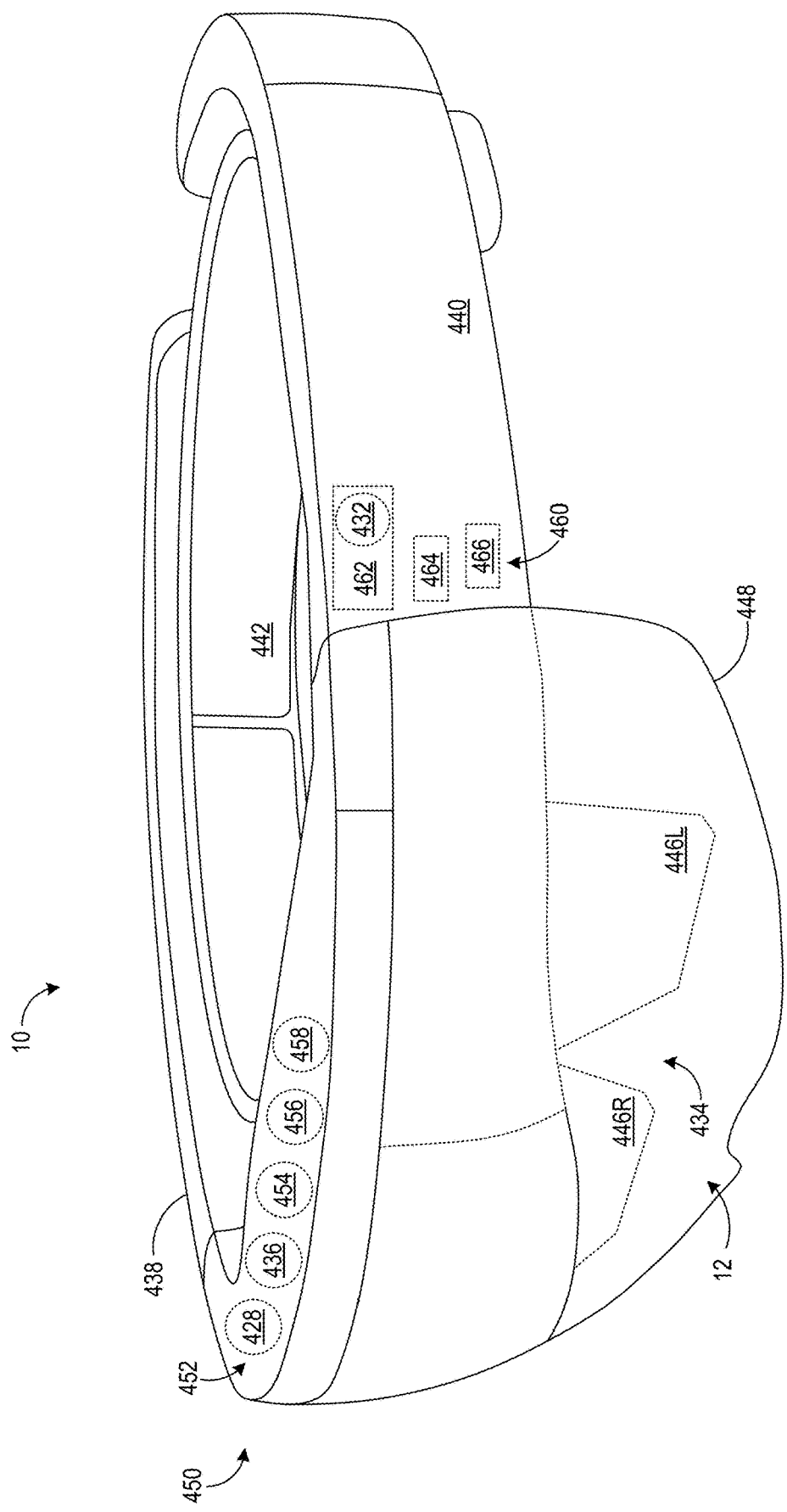
FIG. 4 is a diagram illustrating an example mixed-reality (MR) device.

FIG. 4 illustrates an example of computing device 10, which may be employed as an example of MR device 311 of FIG. 3 and/or computing device 200 of FIG. 2. In the example computing device 10 of FIG. 4, the computing device 10 is a head-mounted display (HMD) device. The illustrated computing device 10 takes the form of a wearable visor, but it will be appreciated that other forms are possible, such as glasses or goggles, among others. The computing device 10 may include a housing 438 including a band 440 and an inner band 442 to rest on a user's head. The display 12 of the computing device 10 may include the at least partially see-through display 434. The at least partially see-through display 434 may be a stereoscopic display and may include a left panel 446L and a right panel 446R as shown, or alternatively, a single panel of a suitable shape. The panels 446L, 446R are not limited to the shape shown and may be, for example, round, oval, square, or other shapes including lens-shaped. The computing device 10 may also include a shield 448 attached to a front portion 450 of the housing 438 of the computing device 10. The at least partially see-through display 434 and/or the shield 448 may include one or more regions that are transparent, opaque, or semi-transparent. Any of these portions may further be configured to change transparency by suitable means. As such, the computing device 10 may be suited for both augmented reality situations and virtual reality situations.

A controller 460 of the computing device 10 may include a logic subsystem 462, a storage subsystem 464, and a communication subsystem 466. The logic subsystem 462 may include one or more processors 432 configured to execute software instructions. A processor of the one or more processors 432 may an example of processing circuit 210 of FIG. 2, and the storage subsystem 464 may include an example of operating memory 220 of FIG. 2.

In some examples, the processor 432 of the computing device 10 is operatively coupled to the display panels 446R and 446L and to other display-system componentry. In some examples, the processor 432 includes logic and associated computer memory configured to provide image signals to the display panels 446R and 446L, to receive sensory signals from a sensor system 452, and to enact various control processes described herein. The sensor system 452 may include one or more location sensors 428, one or more optical sensors 436, a gaze detection system 454, one or more microphones 456, as well as one or more speakers 458. One or more optical sensors 436 may include one or more cameras. The processor 432 may be further configured to provide signals to the sensor system 452.

Display 12 may be configured to display holograms superimposed on a physical environment. Display 12 may be a stereo display that is at least partially see-through, and the hologram may be positioned to appear at a desired depth and position within the user's field of view. Alternatively, in some examples, display 12 includes a display of a portable camera-equipped computing device and the image may be superimposed on an image of the physical environment captured by the camera. In some examples, the processor 432 is configured to store a representation of the physical environment 30 in non-volatile memory 16. The processor 432 may be configured to generate the representation of the physical environment based on inputs received from a sensor system 452.

Figure 5:
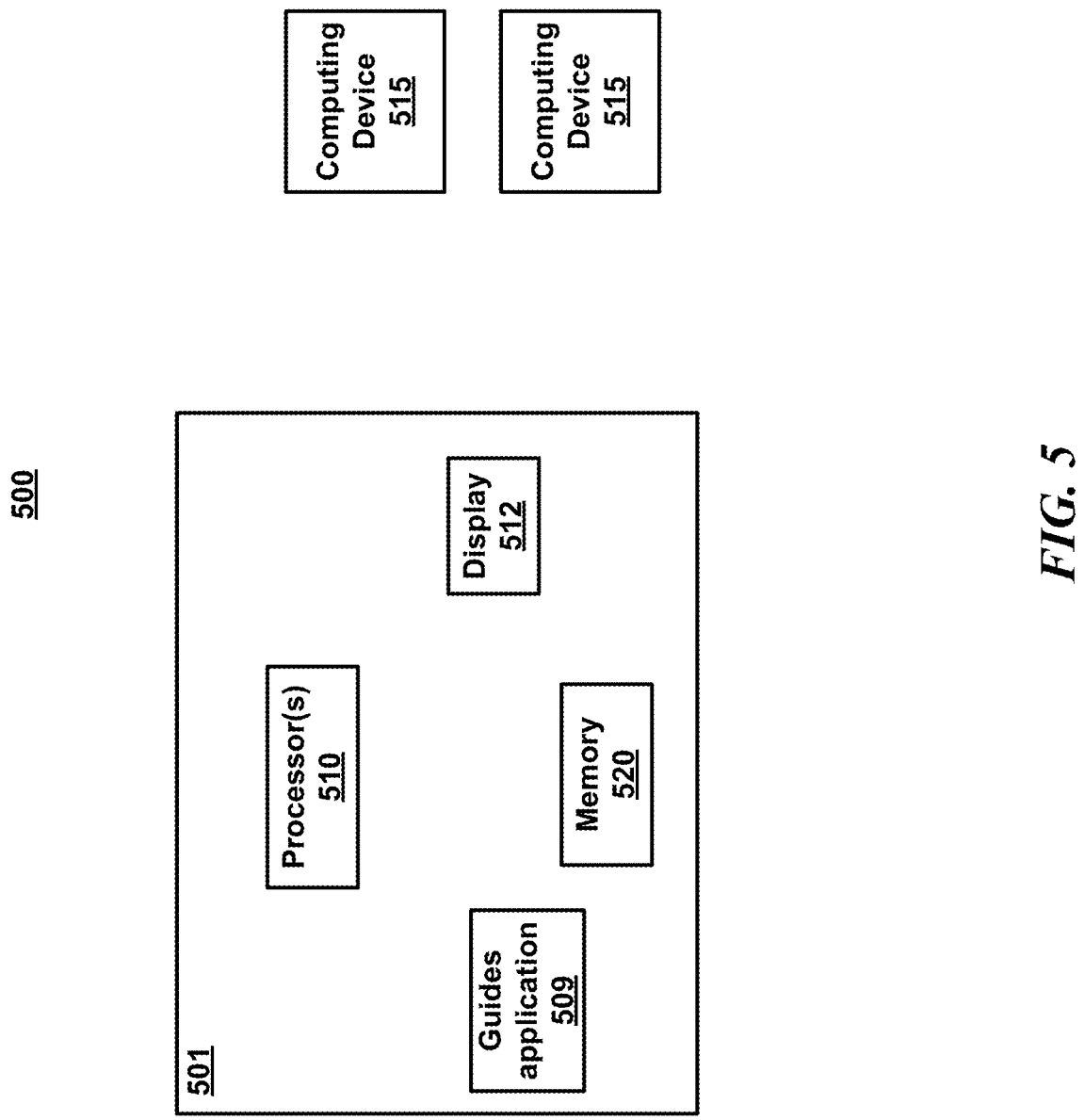
FIG. 5 is a diagram illustrating another example system including a hologram device.

FIG. 5 illustrates an example system (500) including hologram device 501 and computing devices 515. Each of the computing devices 515 may be an example of computing device 200 of FIG. 2 and/or one of the computing devices 110 of FIG. 1. Although two computing devices 515 are illustrated in FIG. 5, in various examples, there may be one computing device 515, three or more computing devices 515, and/or the like. In some examples, hologram device 501 is a computing device that, among other things, provides means for a user to view and interact with holograms. Hologram device 501 may, for instance, be a mixed reality device, such as MR device 311 of FIG. 3 or MR device 10 of FIG. 4. Hologram device 501 may be an example of computing device 200 of FIG. 2, MR device 311 of FIG. 3, and/or computing device 10 of FIG. 4.

Hologram device 501 may include one or more processors 510, operating memory 520, display 512, and guides application 509. One or more processors 510 may be configured to execute instructions, such as instructions for implementing the herein-described workloads, processes, or technology. The instructions may include guide application 509. The aforementioned instructions, along with other data (e.g., datasets, metadata, operating system instructions, etc.), may be stored in operating memory 520 during run-time of hologram device 501. Display 512 may be configured to display holograms to a user of hologram device 501. In some examples, hologram device 501 is a head-mounted display mixed-reality device, or other wearable mixed-reality device.

Many aspects of hologram device 501 are discussed below that may be used in conjunction with each other, or separately. That is, some examples may include all of the aspects of hologram device 501 discussed below, some examples may include but one of the aspects of hologram device 501 discussed below, and some example may include some, but not all, of the aspects of hologram device 501 discussed below. Further, while many aspects of hologram device 501 are discussed in the context of guides application 509, the aspects are not limited to use with guides application 509, and may be applied to various functions provided by hologram device 501 outside of guides application 509. Some examples of hologram device 501 do not include guides application 509, and various of the aspects may be used by hologram device 501 even though hologram device 501 does not include guides application 509. Each computing device 515 may perform various functions in conjunction with guides application 509, such as the authoring and editing of guides, and/or the like.

Step cards may be used with hologram device 501 in a variety of different contexts. One particular context in which the step cards may be used is with guides application 509.

Guides application 509, responsive to execution in hologram device 501, may be a mixed-reality application that provides guidance with real world activities via holograms. For instance, in some examples, guides application 509 may provide holographic instructions when and where they are needed. This may be used to enable an operator to receive step-by-step instructions on new tasks, may act as a checklist for a task that is familiar to the operator, or the like. In some examples, each task is divided into steps. While performing the task using guides application 509, for each step of the task, a holographic step card may be provided to the operator as part of the mixed reality view, where the step card may include an instruction for the current step of the task. The holographic step card may be a two-dimensional hologram or a three-dimensional hologram. The mixed-reality view may also include a tether that connects the step card for the current step of the task to a tether location for the current step of the task.

In various example applications for which hologram device 501 is used, a visual tether is used to connect to a tether location, which is a real-world location at which work is to be performed, at which part of the task is to be performed, or at which some similar step or action is to be performed. At digital object may also exist at the tether location. In some examples, the visual tether connects from the step card to the tether location, where the instruction on the step card is associated with something to be done at the tether location. In some examples, the tether is a holographic dashed white line that connects the step card to the tether location. In these examples, although the tether is a line, the line is typically curved. In some examples, the operator of hologram device 501 can read the instruction on the step card, and then follow the tether from the step card to the tether location. The operator may also use the tether by following the tether to return to the tether location at any time, for example, after the user's attention is distracted. The tether location may also include a 3D hologram associated with the work, task, action, or step that the user is to perform at the tether location.

The step card may include various buttons that the user can activate to perform various functions. For instance, in some examples, the user may be able to use the step card to navigate through various steps of the task, such as through a next step button, a go back button, and other means. The step card may also in some way indicate which step the user is currently on. The step card may include one or more buttons to turn on and off media associated with the step card, such as pictures or video that may assist the operator in performing the step. The step card may include a button to pin or unpin the step card to a particular location. The step card may follow the user's gaze to an extent while unpinned, as discussed in greater detail below. Various options and commands for the step card may be actuated in different ways in different examples, such as through gestures, gaze, and/or voice commands, as discussed in greater detail below.

In some examples, guides application 509 may enable increased productivity in a workforce by enabling the workforce to learn while doing their work. For instance, some examples of guides application 509 enable employees to learn in the flow of work by providing holographic instructions when and where they need them. Guides application 509 may be used in a variety of different contexts, including performing an operation, such as assembly in a manufacturing setting as but one example. In some examples, step cards act as a series of step-by-step instruction cards with image and video support, where each step card is visually tethered to the tether location for the step, the real-world place where the work needs to be done for the step. In some examples, additional guidance in the form of holographic models shows what needs to be done where, so workers can get the job done faster, with fewer errors and greater retention of learned skills, and help reduce the cognitive load of workers.

Guides application 509 may provide authoring tools for the creation and adding of guides to be subsequently used by used to complete the process for which the authored guide provides guidance. In some examples, work processes are captured using the authoring tool to create guides, which, in some examples, are files that include step-by-step instructions with images, video, and/or 3D holograms.

In some examples, the authoring tools may be used to create or partially create the guides on one of the computing devices 515, which may be a device separate from hologram device 501, and then the guides can be transferred to hologram device 501, to complete the guides, and for subsequent use of the guides by operators. In some examples, an author can use the author tools to create a guide on one of the computing devices 515, which may be a personal computer or other computing device. Using the author tools, in some examples, an author can begin authoring a guide using the author tools on one of the computing devices 515, transfer the guide to hologram device 501, and then, using guide application 509 via hologram device 501, connect the step cards and holograms to the physical work space using hologram device 501 by simply picking up and moving the step cards and holograms to the correct locations. In some examples, files, including the guide, are synchronized across several devices, including computing device 515 and hologram device 501, so that, rather than explicitly transferring the file from computing device 515 to hologram device 501, the guide will also be present on hologram device 501 via the file synchronization.

Guides application 509 may enable an improved training system. Typically, training occurs away from the flow of work in a training facility, and then requires a buddy system with experienced mentors to bring workers up to speed. Typically, some complex procedures are not needed regularly, and just-in-time training is needed. Typically, task cards and standard operating procedures are on paper or a 2D device that requires an operator to read, process, and then do.

In contrast, guides application 509 may enable operators to learn a task or be informed of updated instructions while in the flow of work. Guides application 509 may be used for complex procedures on the job or while training away from the production line, providing heads-up, hands-free, step-by-step instruction in the flow of work. Guides application 509 may enable operators to control the interface with their gaze—for example, using a glance to move to the next step—leaving their hands free to do the work.

In some examples, step cards move with the worker, following them as they move around equipment, pointing to the tools and parts they need and showing them exactly how and where to apply them. In some examples, the experience is comfortable, simple to use, and may reduce mental processing time, errors, and the need to rely on a buddy system. In some examples, using a guide via guides application 509, an operator can confidently work through steps of the associated process using a reliably anchored and ergonomic interface.

In some examples, a user may use a holographic guide via guides application 509 using hologram device 501 as follows. In some examples, the user may first calibrate hologram device 501. The calibration may be used to ensure that holograms are properly aligned to the environment. For instance, a guide might be used to assemble a door in a commercial aircraft. Without proper calibration, a user might drill a hole in the wrong place or assemble the wrong part. In some examples, guides application 509 may include multiple applications, including a calibration application. In some examples, the calibration application may lead the user though the calibration process step by step. In some examples, the user's interpupillary distance (IPD) may be determined as part of the calibration, or the IPD may be set prior to the calibration.

In some examples, one or more of gaze, gestures, and/or voice commands may be used to navigate through a guide, including navigating through steps of a task of a guide.

In some examples, a guide may be navigated by gazing at an item, where the item may be, for example, an app, menu, or button. In some examples, the user's gaze may be in the center of the user's view, and indicated via a visual indicator such as a cursor dot or the like. In some examples, dynamic cursors visuals may be used for the gaze cursor when suitable. For instance, in some examples, when the user's gaze is on a button, the gaze cursor is replaced with a spotlight effect on that button. In some cases, a user can select an item by gazing at a selection box. In some examples, the select does not occur immediately; rather, a selection is made responsive to a user's gaze dwelling in the selection box. For instance, in some examples, when the user's gaze enters a selection box, a dwell timer begins, and the selection is made if the user's gaze remains in the box for the entirety of the dwell timer.

In some examples, when the user's gaze enters the selection box, the box begins filling to indicate a select in progress, and the item is selected when the box is filled, which occurs if the gaze remains in the box for the entirety of the dwell timer, with the filling box providing the user with a visual display of the dwell timer. In some examples, a sound is also provided while the box is being filled to indicate that a selection is in process. Selection of an item via gaze may be extremely helpful the user's hands are occupied with tools or parts. In some examples, when a selection box on the Step card is being filled, it is ensured that the Step card does not move.

In other cases, a user may use gaze to target an object, and then act on the target with a gesture. In some examples, a bloom gesture may be used to open or close a pre-determined menu, such as the high-level menu for a guide. In these examples, when a user is uncertain of what to do, the bloom gesture may be a good way for the user to get oriented. In one example, to do the bloom gesture, the user will hold out the user's hand with the user's palm up and fingertips together, and then the user opens the user's hand.

In some examples, as discussed above, an app or other hologram may be selected in multiple ways, including with a gesture. In some examples, the air tap gesture may be used to open a hologram. In some examples, a user may select a hologram with an air tap by gazing at a hologram, holding the user's hand straight in front of the user in a loose fist, and then pointing the user's index finger straight up toward the ceiling, then tapping the user's finger down, and then quickly raising the user's index finger back up again.

In some examples, a user can interact with the holographic environment in different ways, which may vary based on user preferences, or based on the particular circumstances. For example, in some circumstances, a user's hands may not be free to perform gestures, and in some circumstances, the environment be too noisy for voice commands. For instance, in some examples, to perform a selection, a user may use an air tap gesture, may use a voice command (such as saying "select"), or may select with gaze (such as by moving the user's gaze to the corresponding selection box and leaving it there until the selection box if filled). In some examples, a user may say "Next step" to go to the next step, as an alternative to selecting the "next step" button. In some examples, selectable buttons may also include an indication of the voice command that may be used to select the button. For instance, in some examples, the "Next Step" button includes text at the bottom of the Next Step button that says, "Say 'Next Step.'"

In some examples, an operator of hologram device 501 may begin using hologram device 501 to perform tasks by first calibrating hologram device 501, and then opening a guide. In some examples, once a guide is open, the guide first contains alignment instructions. The operator may then align the guide by following the alignment instructions. Aligning the guide may be used to ensure that the holographic instructions line up with the real-world environment. In some examples, some guides may include a marker alignment, which uses a hologram marker that looks just like a printer marker that is in the real-world environment. In some examples, the operator aligns the guide by finding the printed marker in the real-world environment, aligning the hologram marker with the printed marker, and then confirming the alignment.

In some examples, the alignment may be accomplished with a manual alignment rather than a marker alignment. In some examples, to perform manual alignment, the operator uses a gesture to align the guide to a digital 3D representation laid over a physical object in the work area. For instance, in some examples, if the author of the guide chose manual alignment when the author created the guide, the operator would align a hologram with a digital 3D representation of the same object in the real world.

In some examples, after an operator opens a guide, and performs alignment, if necessary, the operator will then see the first Step card of the guide that is provided as a hologram as part of the mixed-reality view. In some examples, the Step cards provides the instructions that an operator follows to complete a task. In some examples, the Step card also includes, among other buttons, two buttons used to navigate through a guide—the Next Step and Go Back buttons. In some examples, once an operator completes a step, the operator can select the Next Step button to go to the next step, and so on, until all of the steps in the guide are completed. In some examples, each step has a corresponding Step card that includes one or more instructions for that step. In some examples, as the operator goes through the steps in a task, the Step card "tags along" with the operator via hologram device 501 to keep the instructions in a location that is useful to the operator.

In some examples, in addition to the Next Step and Go Back buttons, the Step card includes a number of different buttons and user interface (UI) elements to help the operator take various actions.

In some examples, the Step card includes a Task/Guide progress bar. In some examples, the Task/Guide progress bar indicates where the operator is within a task, and within the entire guide. In some examples, the operator can leave a task midway (by using the bloom gesture) and come back to the same position in the guide during a run. In some examples, progress is saved during this step and the operator can start from where the operator left off, unless the operator closed the application.

One example of a description of the buttons and other UI elements on the Step card are as follows, with some of the function discussed in more detail elsewhere:

| Button or UI element | Description |
| --- | --- |
| Home | Choose a different guide |
| Settings | Access to settings. |
| Profile | Sign in and out. |
| Alignment | Realign your guide. Hologram device 501 may sometimes lose tracking, which causes holograms to be misaligned. To fix this, you can realign the guide by gazing at a printed marker or digital 3D representation again. |
| Pin | Lock the Step card in place. This is useful if you want to keep the Step card in one location while you complete the step or task. |
| Outline | Go to the Outline. Use the Outline to quickly navigate around your guide. |
| Task/Guide progress | Shows where you are within a task, and within the entire guide. |
| Media | Close the image or video associated with the step. (If there's an image or video associated with a step, it appears automatically when you go to that step.) |

In some examples, Step cards are linked by holographic tethers to physical areas in the work area. In some examples, a tether is a holographic link that ties a step visually to an area, object, or the like that is relevant to the step. A tether may help the operator find the area where the operator needs to take an action. In some examples, the tether is a holographic dashed white line leading from the step card to an area, object, or the like that pertains to the step indicated on the Step card. The operator may follow the tether to find the physical area where the operator needs to do the work, and then, once the work is completed, or when the operator needs to refer back to the step, follow the tether back to the Step card to read the instructions. If the tether points behind the operator, then the operator may step to the side and then continue to follow the tether.

In some examples, the tether serves to tether instructions to the real world. In this way, in these examples, an operator may follow the tether in order to look at what the instructions are referring to in the real world. Instructions may also be useful if an operator returns to the task—the operator may follow the tether to return to a work area. The tether may link the Step card to the tether location—the real-world location at which work is to be performed for the step. There may also be a three-dimensional hologram at the tether location. For instance, if a part is to be installed in a machine during the step, the tether may connect the step card to the location where the part is to be installed, with, at the location, a three-dimensional hologram of the part that is to be installed, as the part will appear once the part has been installed.

In some examples, as default behavior, wherever the operator looks, the Step card follows the operator's gaze—that is, the Step card "tags along" with the operator's gaze. In this way, the operator does not have to worry about where the instructions are while working. In some examples, the Step card only follows the operator's gaze when the operator indicates significant intention to move to a new area. This may be accomplished in different ways in different examples. In some examples, the card does not move when the operator is in the process of selecting buttons on the card. In some examples, there is a safe zone around the card, which may, in some examples, be a pie shape or cone shape at a particular angle. In some examples, the safe zone is dynamically adjusted based on one or more factors. For instance, in some examples, the safe zone may be adjusted based on whether other content, such as media, is present.

In some examples, if the operator's gaze crosses the threshold of the safe zone, a timer is started. In some examples, if the operator's gaze remains outside of the safe zone for the duration of the timer, then the Step card moves to the new location of the operator's gaze. In one example the timer may be a two-second timer, and in other examples, other suitable durations for the timer may be used.

The gaze determination is not necessarily limited to the angle of the operator's gaze, but may also be based on other aspects of the operator's gaze and/or the operator's head movements. For example, the gaze determination is not necessarily limited to the spot at which the operator is gazing, but also to where the user's head is relative to the spot at which the operator is gazing. For example, if the operator's gaze moves to a lower position, the tag-along behavior of the card may vary depending on whether the user's head remained in the same position with the user looking downward at the lower spot, or whether instead the operator squatted down, keeping his gaze at the same angle but looking at a lower spot due to the operator's head being at a lower position.

In some examples, certain rules are used for the Step card regardless of the Step card's movement. For instance, in some examples, the Step card is prevented from moving while a selection box on the Step card is filling as a result of gaze. In some examples, the instruction card is kept at a minimum forwards distance threshold from the operator. For instance, in some examples, the minimum forwards distance threshold may be the minimum focal distance away from the operator, such as at least 2.1 meters away from the operator according to one example. For instance, in some examples, if the operator moves closer to the Step card than the minimum forwards distance threshold, the Step card will move backward to maintain the minimum distance.

In some examples, the entire Step card is kept in the operator's view when appropriate. As discussed above, the Step card may be left out of the operator's view when the operator's gaze has moved but the operator has not indicated an intention to move the operator's view to a new area. In some examples, it is ensured that, whenever the Step card is out of the operator's view, wherever the operator looked last, it is ensured that the Step card is already be there where the operator looked last, or be moved into the operator's view after a short period of time responsive to the operator returning the user's view to the location where the operator looked last.

In some examples, if the operator moves backward, a determination will be made as to whether the instruction card is in the operator's view. If so, in these examples, a determination is made as to whether the distance from the operator to the Step card is greater than a particular threshold, such as 3.1 meters. If so, in these examples, the Step card is moved toward the operator so that that the Step card is a distance equal to the minimum forwards distance.

Some previous examples above involved a safe zone, that may be a cone shape or the like, in which a timer begins responsive to the operator's view leaving the safe zone, and in which the Step card moves into the operator's current view responsive to the operator's view remaining outside of the safe zone for a threshold period of time. However, in some examples, horizontal rotation and vertical rotation are treated differently. For instance, in some examples, responsive to the view of operator rotates horizontally more than a threshold number of degrees, a timer starts, and responsive to the view of the operator remaining beyond the threshold horizontal angle for a determined period of time, the Step card moves to the center of the user's view. In some examples, responsive to the operator's view rotating vertically by more than a vertical angle threshold, the horizontal angle threshold is deactivated. In some examples, the threshold horizontal angle is 29.5 degrees, and the threshold vertical angle is 3 degrees. In some examples, the threshold angles may be fixed, and in other examples, the threshold angles may be dynamic. As discussed above, in some examples, the detected angle is determined not just based on a change of the gaze position, but also on head movement. For instance, some examples, if the user's gaze is on a lower position because the user squatted down, but the user is looking at the same angle, this does not count as a change in vertical angle of the user's view. In contrast, in these examples, if the user's head remains in the same position but the operator's gaze is on a lower spot, this counts as a change in the vertical angle of the user's view.

In some examples, responsive to the operator squatting more than a particular distance such that the user's gaze is in a correspondingly lower position, a timer begins. In some examples, responsive to a particular time expiring with the operator still so squatting, the Step card moves to the new position of the user's gaze. In some examples, the timer for squatting is different than the timer for horizontal location. The thresholds for squatting, including the squatting distance and the timer, may be fixed or dynamic in various examples.

In some examples, the operator can pin the Step card to turn off the tag-along feature, so that the Step card will not follow the operator's gaze while the Step card is pinned. In some examples, to pin the Step card, the operator selects the Pin button. In some examples, the pin action can be selected in various ways, such as selecting the Pin button by gaze, selecting the Pin button by gesture, or by voice command. In some examples, once the Step card is pinned, the operator can grab the Step card and move the Step card. For instance, in some examples, the operator can move the Step card by using a tap-and-hold to place the Step card in a new location. In some examples, while the Step card is pinned, even though the Step card remains in the same location unless the operator selects and moves it, the Step card stays in the same location but rotates to face the operator.

In some examples, there is a command that can be used "beckon" or "summon" a pinned Step card to the operator's location. For instance, in some examples, if the operator says, "instructions," the step card will appear at the location of the operator's current gaze, even if the step card is pinned. In some examples, once pinned, the card remains in the same location, correlated to the real world, until there is an operator command to the contrary, such as an operator command to beckon the card, to move the card, or to unpin the card. In some examples, no matter where the operator pins or beckons the instructions, the tether from the instructions to the corresponding real-world location remains tethered to the real-world location.

In some examples, the operator can turn holograms off (or turn them back on), for example if the operator feels like a hologram is getting in the way. In some examples, an operator can turn off a hologram by gazing at the "eye" in the middle of the tether.

Figure 6:
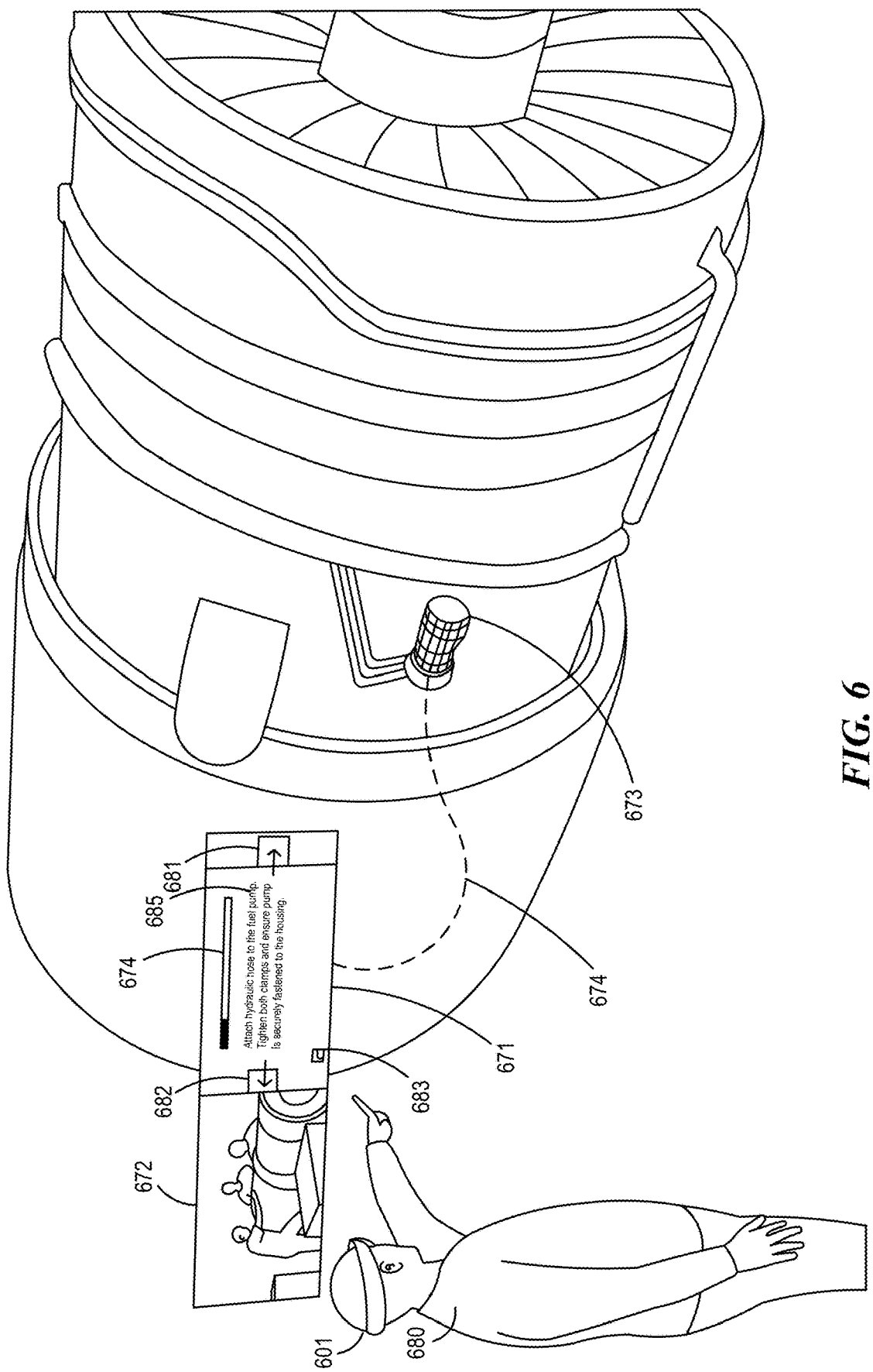
FIG. 6 is a diagram illustrating an example of an operator using an MR device.

One example of use of hologram device 501 is illustrated in FIG. 6. In the example illustrated in FIG. 6, an operator 680 is wearing mixed-reality (MR) device 601. Mixed-reality device 601 is an example of hologram device 501 that is a wearable, head-mounted display mixed-reality device. Via MR device 601, in the example illustrated in FIG. 6, the operator can see step card 671, picture 672, 3D hologram 673, and tether 674, all superimposed on a real-world environment. In some examples, tether 674 tethers step card 671 to the location in the real-world environment where work is to be performed for the current step. Step card 671 may include Next Step button 681, Go Back button 682, Media button 683, Task Progress bar 684, and instructions 685.

Next Step button 681 may be used to proceed to the next step in the task. Go Back button 682 may be used to go to the previous step in the task. Media button 683 may be used to toggle and off media, such as pictures, video, and/or other media present for the step. For the step illustrated in FIG. 6, media button 683 may be used to toggle on and off picture 672. In some examples, task progress 684 indicates how far along the current step is in the task. FIG. 6 shows but one example of a step card, and other examples may include more or less buttons than shown in FIG. 6. For example, as discussed above, some examples of the step card may include a pin button that may be used to pin or unpin the step card. Instructions 685 are instructions associated with the current step of the task, which is related to 3D hologram 673 at the tether location, where tether 674 is connected between step card 671 and the tether location.

3D hologram 673 is an example of a three-dimensional hologram at the tether location, which is the real-world location where work is to be performed in the real-world environment for the current step in the task. As shown in FIG. 6 in accordance with one example, tether 674 is a visual tether from Step card 671 to the tether location.

Returning to FIG. 5, although guides provided by guides application 509 may be useful for relative beginners, one or more guides may also be useful to experts. For instance, an expert may benefit from turning off holograms and/or tethers, but still using a checklist. The checklist may be particularly useful, even for an expert, particularly for use with a complex task for which it is crucial not to miss any steps.

In some examples, the authoring of guides for guides application 509 may be accomplished with the use of two applications: one application on one of the computing devices 515, and guides application 509 in authoring mode. In some examples, an author may start with an application on one of the computing devices 515, using the application to create the guide, choose an alignment method, add tasks and steps, write the instructions for the steps, and assign different types of assets to support those steps. In some examples, these supporting assets may include: 3D parts; 3D objects, such as objects from the 3D toolkit (arrows and numbers, for example); 2D media (images and videos); and/or the like.

In some examples, after creating the guide on an application on computing device 515, the author may use guides application 509 on hologram device 501 in Authoring mode to test the flow of the guide, assign holographic tethers to show operators where to focus, place holograms in the real world, and add styles to 3D objects (such as a warning or caution, for example).

The author may also choose an alignment method for the guide. Alignment may refer to the process of gaining an understanding of the world around the user and accurately placing holographic instructions in relation to their work. In some examples, calibration takes into account the user's interpupillary distance (a number that varies across individuals) that further improves alignment. In some examples, if marker alignment is selected, the author attaches a printed marker to a physical object in the real world. In some examples, if manual alignment is selected, the user imports a 3D representation (such as a CAD model or scanned model), and then lays the representation directly over a physical object in the real world. Independent from the method used for alignment, the following additional factors may impact the accuracy of the alignment and/or user perception of the alignment: the Interpupillary distance (IPD) setting, pre-scanning the environment, and device positioning. The IPD is the distance between the center of the user's pupils, which may be set on hologram device 501, as discussed in greater detail above.

Pre-scanning the environment may be accomplished by hologram device 501 actively scanning its environment for visible features to create maps of its surroundings. In some examples, hologram device 501 pre-scans the environment whenever the hologram device 501 is turned on and a user is signed in to hologram device 501. In some examples, hologram device 501 constantly improves the accuracy of these maps as it scans the environment from different viewpoints and stores them on the device. In some examples, holograms are placed in relation to these maps. In some examples, the more accurate the map, the more accurate the hologram placement.

In some examples, before using Guides on a hologram device 501 that is unfamiliar with its environment, the user may wish to put on hologram device 501, sign into hologram device 501, and walk around the space where hologram instructions are placed or will be placed. In some examples, walking at a leisurely pace while slowly looking up and down will give the device the opportunity to find features and construct accurate maps. In some examples, this only need be done once for each environment because hologram device 501 stores the maps it created on the hologram device 501.

In some examples, after selecting an alignment method, the author may use the Outline page, which may be used to create the framework for the guide by adding as many tasks and steps as needed. In some examples, tasks are groups of steps; steps are the short, discrete work items that operators do to complete the task; and steps are the central building blocks for guides. In some examples, a special step called a Completion step as the last step of the guide lets operators know when they've reached the end of the guide. In some examples, the tasks, and the steps for each task, are entered on the Outline page. In some examples, in addition to tasks and steps, the Outline page shows customizable operator instructions.

In some examples, steps can be created directly on the outline page, or from a Step card page. In some examples, in the Step card page, the author writes the instructional text and assigns supporting assets for that step, such 3D content or media (e.g., image, audio, and/or video). In some examples, when the author views the guide on hologram device 501 in Authoring mode, the author will be able to see all of the assets that are associated with the steps, and can then use the authoring mode place the assets in their relevant spaces in the real world. For instance, in some examples, if an author assigns a pointer to a step in the application on one of the computing devices 515, the author can subsequently align that pointer to the thing that the author wishes to point to in the authoring mode of guides application 509 of hologram device 501. The author may place one or more instances of 3d models in space.

In some examples, once the author has finished the creating all of the steps on the application of one of the computing devices 515, the author can then take the next major step to creating the guide on hologram device 501, in Authoring mode of guides application 509. In entering Authoring mode, the author may align the guide, test the flow of the guide, add holographic tethers to visually tie the steps to physical objects in the real world, place holographic 3D content in the relevant corresponding spaces in the real world, and may, if desired, add styles to 3D content to add treatments such as a warning or caution. In some examples, the author can add visual design, including color, size, style selection, and other tools, including the selection of the color and size of holograms.

After aligning the guide, the author may test the flow of the whole guide to see how the guide flows. As the author steps through the guide, the author may make note of things be changed in the guide. For example, as a result of stepping through the guide, the author may wish to move some steps around, add tasks or steps, or add more supporting assets, and the author may wish to make these changes on one of the computing devices 515 before starting to place holograms, tethers, and styles.

In some examples, the author may choose pre-determined locations for the step card, for each step while authoring, and the author may choose, if preferable based on the space, a particular position for the step card rather than the position being determined more dynamically, by using pre-determined pinning of the card for each step.

When placing holograms, the author may walk through each step in the guide and place any assets that the author associated with that step when it was authored on one of the computing devices 515. For example, if the author added a 3D part to support a step, the author may place that 3D part over the part's physical counterpart in the real world. If the author added a 3D object from the 3D toolkit (an arrow or a number, for example), the author may place that object in an appropriate place in the real world to draw the operator's focus. In some examples, the author can place the same 3D part or 3D object as many times as desired.

In some examples, no further actions are necessary with regard to associated media such as video or audio, which will automatically appear when the operator goes to the step. In some examples, the user can select the Media button to close the image, video, or other media.

In some examples, the 3D assets associated with each step appear below the Step card. In some examples, to place them in the real world, the author may manipulate holograms as discussed elsewhere, such as via gestures. Tethers may be placed in the real-world environment, for example via gestures. Similarly, styles may be applied to holograms.

Figure 7:
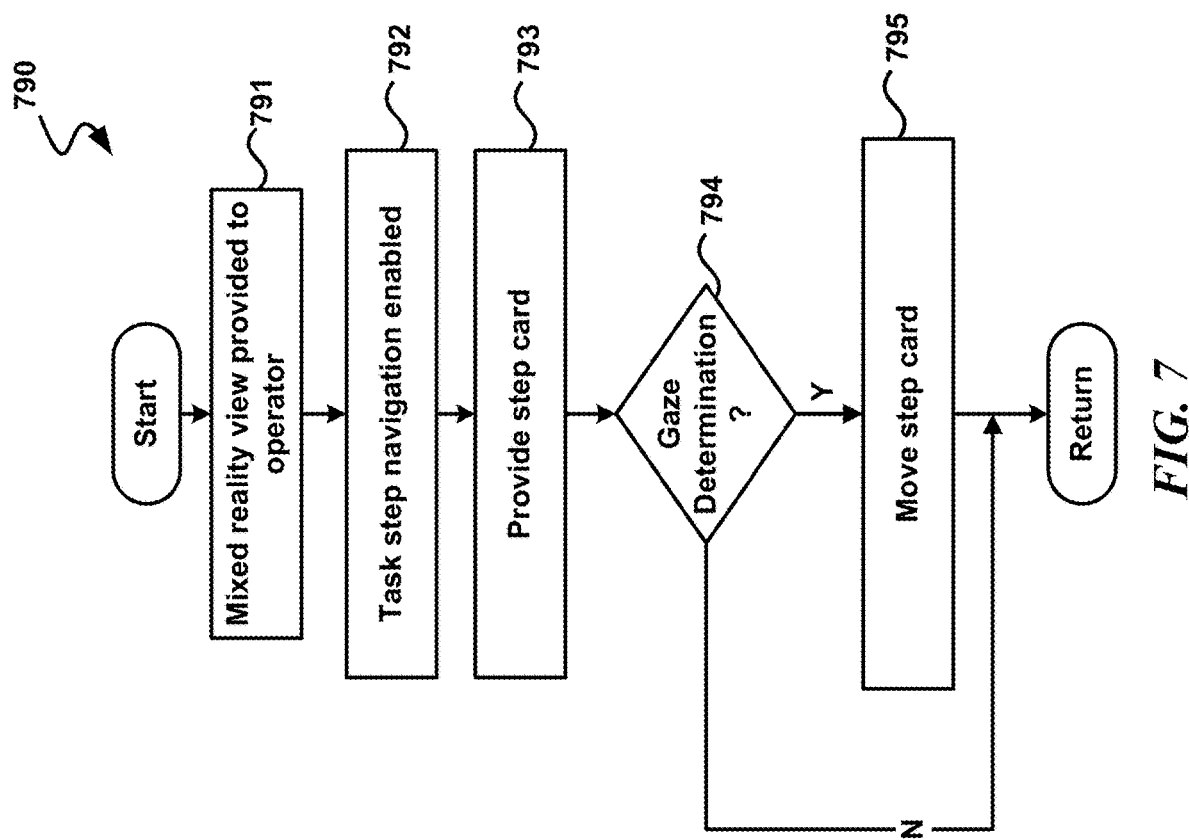
FIG. 7 is a flow diagram illustrating an example of a process for an MR view, in accordance with aspects of the present disclosure.

FIG. 7 illustrates an example dataflow for a process (790) for an MR view. In some examples, process 790 is performed by a device, such as device 200 of FIG. 2, MR device 311 of FIG. 3, computing device 10 of FIG. 4, hologram device 501 of FIG. 5, or MR device 6*m* of FIG. 6.

In the illustrated example, step 791 occurs first. At step 791, in some examples, a mixed-reality view is caused to be provided to an operator. In some examples, the mixed-reality view includes both a real-world environment of the operator and holographic aspects. As shown, step 792 occurs next in some examples. At step 792, in some examples, the operator is enabled to navigate among a plurality of steps of a task, such that for at least one step of the plurality of steps of the task, while the operator is navigated to the step of the task, the mixed-reality view is caused to include a step card, such that the step card includes at least one instruction associated with the step. As shown, step 793 occurs next in some examples. At step 793, in some examples, the operator is enabled to adjust a state associated with the step card.

As shown, decision block 794 occurs next in some examples. At block 794, in some examples, a gaze determination associated with a gaze of the operator is made. If the determination at decision block 794 is negative, the process may then proceed to the return block, where other processing is resumed. If instead the determination at decision block 794 is positive, the process may proceed to step 795. At step 795, in some examples, responsive to the positive gaze determination, the step card is caused to move to a location that is associated with a real-world location of the gaze of the operator. The process may then advance to the return block.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
causing a mixed-reality view to be provided to an operator, wherein the mixed-reality view includes both a real-world environment of the operator and holographic aspects; and
enabling the operator to navigate among a plurality of steps of a task, such that for at least one step of the plurality of steps of the task, while the operator is navigated to the step of the task:
causing the mixed-reality view to include a step card, such that the step card includes at least one instruction associated with the step;

enabling the operator to adjust a state associated with the step card, wherein while the step card is in a pinned state, the step card is fixed to a fixed current physical location; and wherein while the step card is in an unpinned state, the step card is not fixed to a physical location; and each time a gaze condition occurs while the state associated with the step card is in the unpinned state, causing the step card to move to a location that is associated with a real-world location of the gaze of the operator, wherein the gaze condition is associated with at least one of a gaze of the operator or head movements of the operator; wherein the gaze condition is based, at least in part, on a determination as to whether the gaze of the operator has exited a safe zone area around the step card that includes the step card, and remained outside of the safe zone area for a pre-determined amount of time, wherein the safe zone area is at least one of a pie shape or a cone shape.

2. The apparatus of claim 1, wherein the gaze condition is based on a determination as to whether at least one of the gaze of the operator or the head movements of the operator have indicated a significant intention of the operator to operate with the gaze of the operator in a Previously Presented real-world location.

3. The apparatus of claim 1, wherein the gaze condition is based upon both the gaze of the operator and a head position of the operator.

4. The apparatus of claim 1, wherein the gaze condition is based on a determination as to whether a horizontal rotation associated with the gaze of the operator has exceeded a threshold horizontal angle, and remained beyond the threshold horizontal angle for a threshold amount of time.

5. The apparatus of claim 1, wherein the gaze condition is based on a determination as to whether a user has squatted at least a threshold distance, and remained squatting at least the threshold distance for a threshold amount of time.

6. The apparatus of claim 1, wherein the step card is included in a plurality of step cards, wherein the plurality of step cards correspond to the plurality of steps, and wherein the actions further include, while the operator is navigated to a step of the plurality of steps, causing the mixed-reality view to include the corresponding step card of the plurality of step cards.

7. The apparatus of claim 1, wherein the device is a wearable mixed-reality device that includes a head-mounted display.

8. The apparatus of claim 1, wherein enabling the operator to navigate among the plurality of steps of the task includes enabling the operator to navigate among the plurality of steps of the task via at least one of gaze, gestures, or voice commands from the operator.

9. The apparatus of claim 1, the actions further including causing the mixed-reality view to further include: a three-dimensional hologram that is associated with the step, and a holographic tether that connects the step card to the three-dimensional hologram that is associated with the step.

10. The apparatus of claim 1, wherein the first state of the step card is an unpinned state, and wherein the actions further include, while the step card is a pinned state, causing the step card to remain in a fixed real-world location until caused to move responsive to a command by the operator.

11. The apparatus of claim 10, wherein the command by the operator is a gesture to move the step card.

12. The apparatus of claim 1, wherein the gaze condition is further based on a determination as to whether a vertical rotation associated with the gaze of the operator has exceeded a threshold vertical angle, and remained beyond the threshold vertical angle for a threshold amount of time; and wherein the threshold horizontal angle is deactivated responsive to the vertical rotation associated with the gaze of the operator exceeding the threshold vertical angle.

13. The apparatus of claim 1, wherein the safe zone area is a cone shape.

14. A method, comprising:

causing a mixed-reality view to be provided to an operator, wherein the mixed-reality view includes both a real-world environment of the operator and holographic aspects; and enabling the operator to navigate among a plurality of steps of a task;

causing the mixed-reality view to include a step card, such that the step cards includes at least one instruction associated with a step of the plurality of steps to which the operator is currently navigator, wherein while the step card is in a pinned state, the step card is fixed to a fixed current physical location; and wherein while the step card is in an unpinned state, the step card is not fixed to a physical location; and each time a gaze condition occurs while the state associated with the step card is in the unpinned state, causing the step card to move to a location that is associated with a real-world location of the gaze of the operator, wherein the gaze condition is based, at least in part, on a determination as to whether the gaze of the operator has exited a safe zone area around the step card that includes the step card, and remained outside of the safe zone area for a pre-determined amount of time, wherein the gaze condition is further based on a determination as to whether a vertical rotation associated with the gaze of the operator has exceeded a threshold vertical angle, and remained beyond the threshold vertical angle for a threshold amount of time; and wherein the threshold horizontal angle is deactivated responsive to the vertical rotation associated with the gaze of the operator exceeding the threshold vertical angle.

15. The method of claim 14, wherein the gaze condition is based on a determination as to whether the gaze of the operator has indicated a significant intention of the operator to operate with the gaze of the operator in a Previously Presented real-world location.

16. The method of claim 14, wherein the first state of the step card is an unpinned state, the method further comprising: while the step card is a pinned state, causing the step card to remain in a fixed real-world location until caused to move responsive to a command by the operator.

17. The method of claim 14, wherein causing the mixed-reality view to be provided to the operator is accomplished via a wearable mixed-reality device that includes a head-mounted display.

18. The method of claim 14, wherein the safe zone area is at least one of a pie shape or a cone shape.

19. A processor-readable storage medium, having stored thereon processor-executable code for computer network design, that, upon execution by at least one processor, enables actions, comprising:

enabling an operator of a mixed-reality device to view a step card that is associated with a step of a task, such that the operator can simultaneously view a real-world environment, the step card, and at least one three-dimensional hologram;

enabling the operator to cause the step card to toggle between a pinned state and an unpinned state, wherein while the step card is in the pinned state, the step card is fixed to a fixed current physical location; and wherein while the step card is in the unpinned state, the step card is not fixed to a physical location; and each time the operator has indicated an intention to move to a Previously Presented area in the real-world environment while the state associated with the step card is in the unpinned state, causing the step card to move to the Previously Presented area, wherein the indication of the intention to move to the Previously Presented area is based, at least in part, on a determination as to whether a gaze of the operator has exited a safe zone area around the step card that includes the step card, and remained outside of the safe zone area for a pre-determined amount of time, wherein the safe zone area is a cone shape.

20. The processor-readable storage medium of claim 19, wherein the actions further include, while the step card is a pinned state, causing the step card to remain in a fixed real-world location until caused to move responsive to a command by the operator.

\* \* \* \* \*